April 6, 1937.  J. GUNN  2,076,339
JACK SEATING DEVICE
Filed July 10, 1935
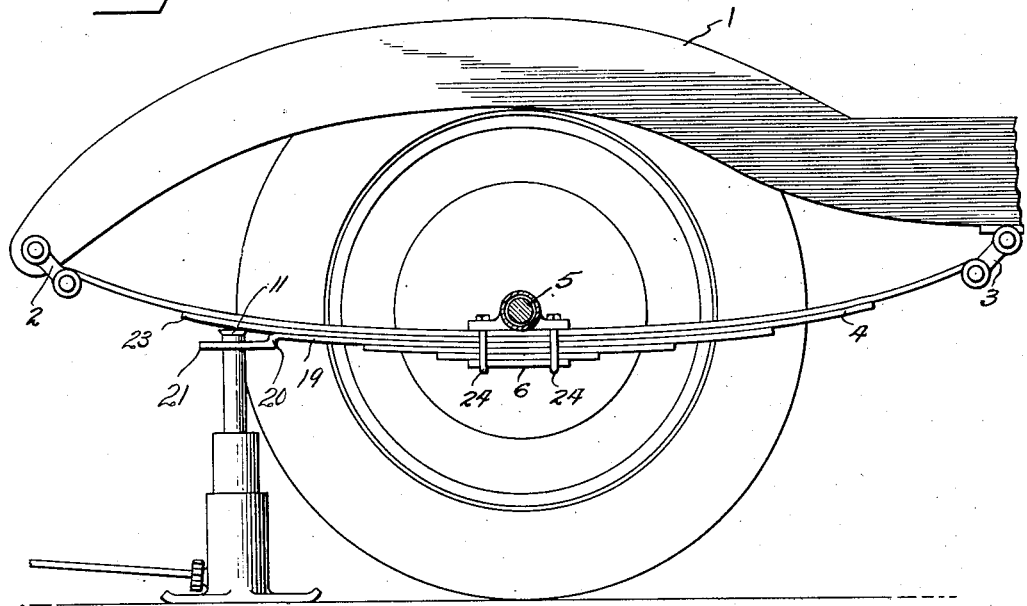
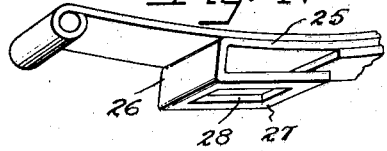
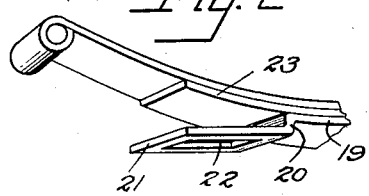
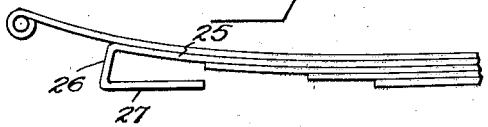
Inventor
John Gunn
By Mason Fenwick & Lawrence
Attorneys Patented Apr. 6, 1937

2,076,339

UNITED STATES PATENT OFFICE 2,076,339

JACK SEATING DEVICE

John Gunn, Philadelphia, Pa.

Application July 10, 1935, Serial No. 30,679

2 Claims. (Cl. 267—36)

This invention relates to jack seats for automobile springs.

From the early days of automobile, it has been customary to place the jack directly beneath the front or rear axle for lifting a wheel to change a tire, and this was done with no great inconvenience, for the wheels were high, the front and back axles substantially in the vertical planes of the front of the radiator and back of the body, respectively, with no overhanging structure to hamper the easy placing of the jack.

The evolutionary development of the automobile has steadily increased the overhanging of both the front and rear of the automobile with respect to the axles, and the universal adoption of the balloon tire has diminished the clearance between the chassis and road when the tire is flat, making the axles so inaccessible that the placement of the jack beneath the axles is a matter of the greatest inconvenience and uncertainty, notwithstanding which the manufacturers have apparently entirely ignored the growing difficulty of placing the jack in the usual position, so that in this day of refinement in automobile design and operation, the changing of a tire is a major bugbear, principally on account of the inconvenience experienced in placing and working the jack.

The object of the present invention is to provide a jack seat adapted to be placed forwardly of the front axle or rearwardly of the rear axle for receiving and/or retaining the head of the jack.

Another object of the invention is to provide a jack seat of the type described adaptable to be used with automobiles now in being, or to be incorporated in automobiles at a stage in their manufacture.

A further object of the invention is the provision of a jack seat associated with the vehicle spring either as an adjunctive device or as part of the spring itself.

A specific object of the invention is the provision of an accessory jack seat adapted to be flexibly secured to the spring so as to be retained in operative position without interfering with the independent movements of the spring leaves incident to the flexing of the spring.

Other objects of the invention will appear as the following description of a preferred and other practical embodiments thereof proceeds.

In the drawing which accompanies and forms a part of the present invention and throughout the several figures of which the same characters of reference have been employed to designate identical parts:

Figure 1 is a side elevation of the rear portion of a chassis illustrating an accessory jack seat in position, embodying the principles of my invention;

Figure 2 is a perspective view of the jack seat shown in Figure 1;

Figures 3 and 4 are, respectively, a side elevation and a perspective view showing another form of jack seat;

Referring now in detail to the several figures and first adverting to that form illustrated in Figures 1 and 2, the numeral 1 represents the rear portion of one of the longitudinal frame members of the chassis of an automobile having the spring shackles 2 and 3 at the customary spaced points and suspending between them the vehicle spring 4. The rear axle is indicated at 5, and the numeral 6 represents the plate immediately beneath the axle against which the jack is usually placed for lifting the wheel off the ground. It is obvious that when one adds to the inboard distance of the axle 5 from the rear end of the frame member 1, the space occupied by the gasoline tank, not shown, and the rear overhanging stream lined portion of the body, it is extremely difficult for one standing at the rear of the car to gage the distance between the plate 6 and the ground, which is necessary for the preliminary seating of the jack, or to slide the jack into place or to operate the jack after it is in place on account of the small angle which the handle of the jack must make with the plane of the ground.

It is of course conceivable that one might place the jack against the underside of the spring rearwardly of the rear axle and attempt to lift the car by elevating the spring, but the curve of the spring which increases with the lift of the jack would almost invariably cause the head of the jack to slip out of place and let the automobile down.

Figure 2 shows that I have devised an accessory jack seat which is adapted to be built in as an integral part of the spring. In this modification, one of the spring leaves 19 is provided near one end with a downward offset 20 and an outward extension 21, the latter being formed with an aperture 22 for receiving the head of the jack which bears against the overlying spring leaf 23. The extension 21 forms a closed rim for retaining the jack against slipping. This spring leaf is interleaved along with the other spring leaves at the time the spring is assembled and retained in place by the U-bolts 24 which hold the spring together.

Figures 3 and 4 show a variant of the invention in which the spring leaf 25 is provided with the downwardly extending offset 26 and the inwardly turned lug 27, the latter having a perforation 28 and being similar to the outward extension shown in Figure 2 which forms a surrounding rim for the head of the jack. The form of the invention shown in Figure 3 distinguishes from that of Figure 2 in that the head of the jack bears against the underside of the spring leaf having the differentiated end, and not the one above it. The modification shown in Figures 3 and 4 is designed to be built in the spring at the time of its manufacture.

It is apparent from the above disclosures that it is possible to exemplify my invention in a number of specific embodiments, wherefore let it be understood that my invention is not restricted by the details of construction as shown and described, but includes any and all means for carrying out the inventive principle which are included in the terms of the appended claims.

What I claim is:

1. In combination, a vehicle spring and a jack seating member comprising a metal strip inserted between spring leaves and secured by the spring leaf securing means, said strip having a portion offset from a jack-engaging surface and apertured to form a jack encompassing member.

2. In combination, a vehicle leaf spring, one of said leaves constituting a jack seating member by having a portion offset from a jack-receiving surface of said spring and adapted to form a jack encompassing member for retaining said jack in position.

JOHN GUNN.